No. 811,336. PATENTED JAN. 30, 1906.
F. M. STAMBAUGH.
MACHINE FOR CUTTING GEAR WHEELS.
APPLICATION FILED MAR. 7, 1905.
3 SHEETS—SHEET 1.
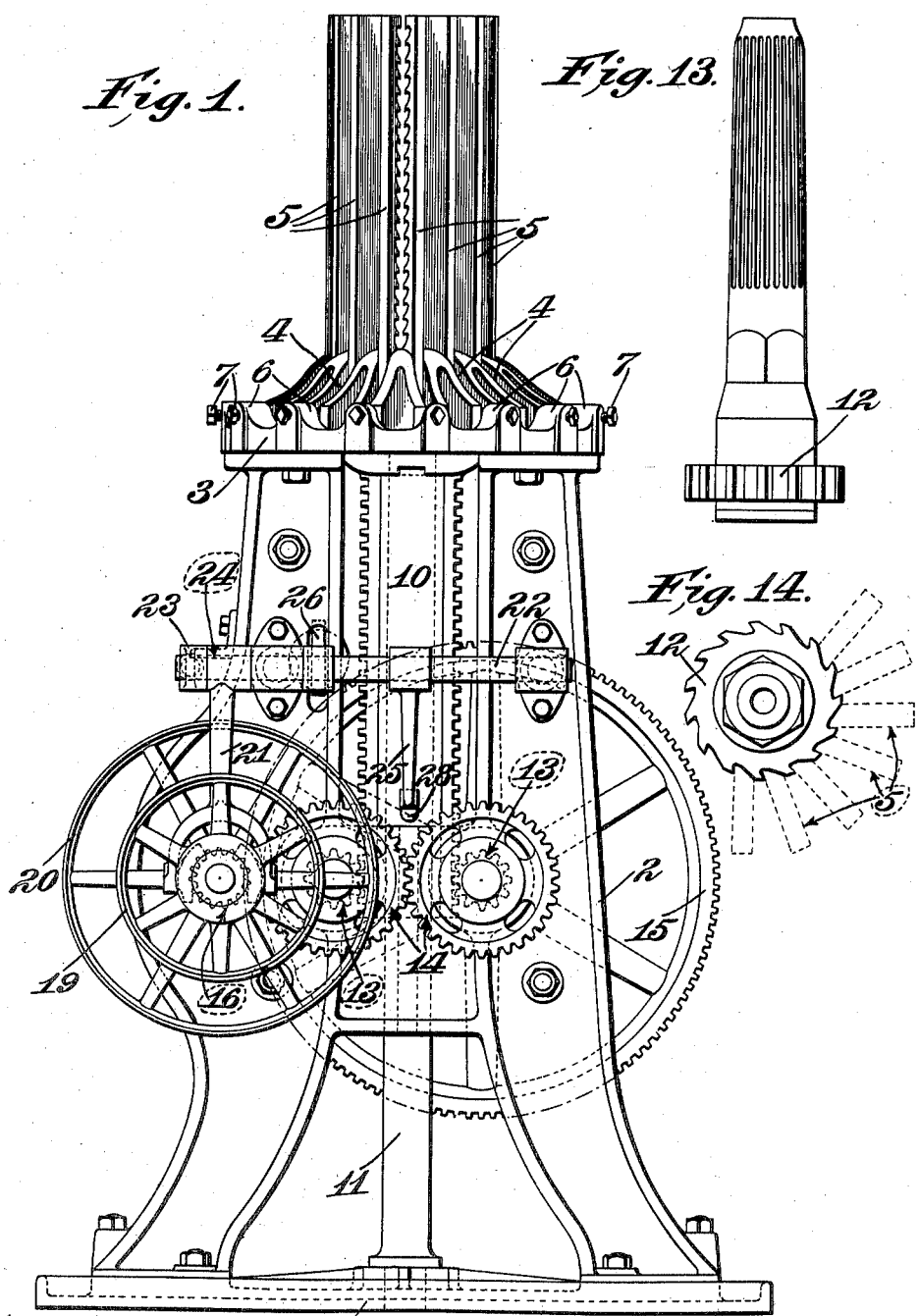

No. 811,336. PATENTED JAN. 30, 1906.
F. M. STAMBAUGH.
MACHINE FOR CUTTING GEAR WHEELS.
APPLICATION FILED MAR. 7, 1905.
3 SHEETS—SHEET 2.
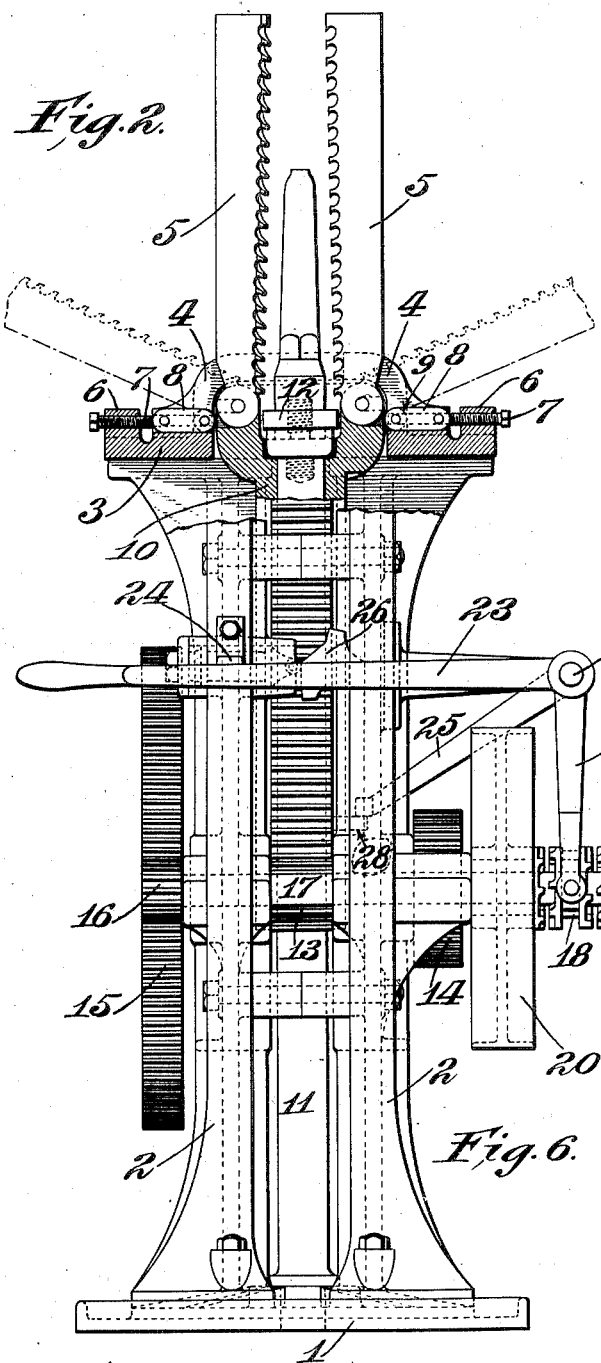
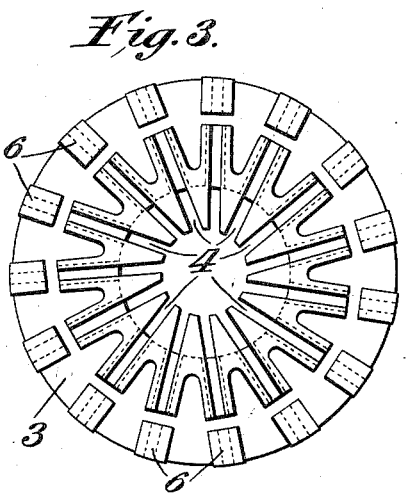
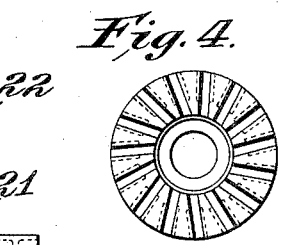
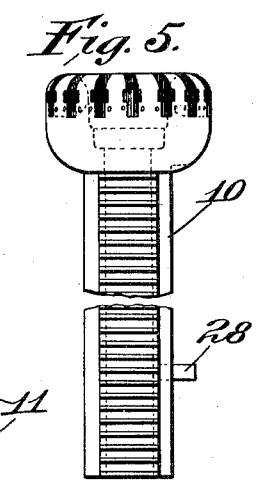
Witnesses:
G. A. Pennington
A. J. McCauley
Inventor:
Francis M. Stambaugh,
by Bakewell & Cornwall
Attys.

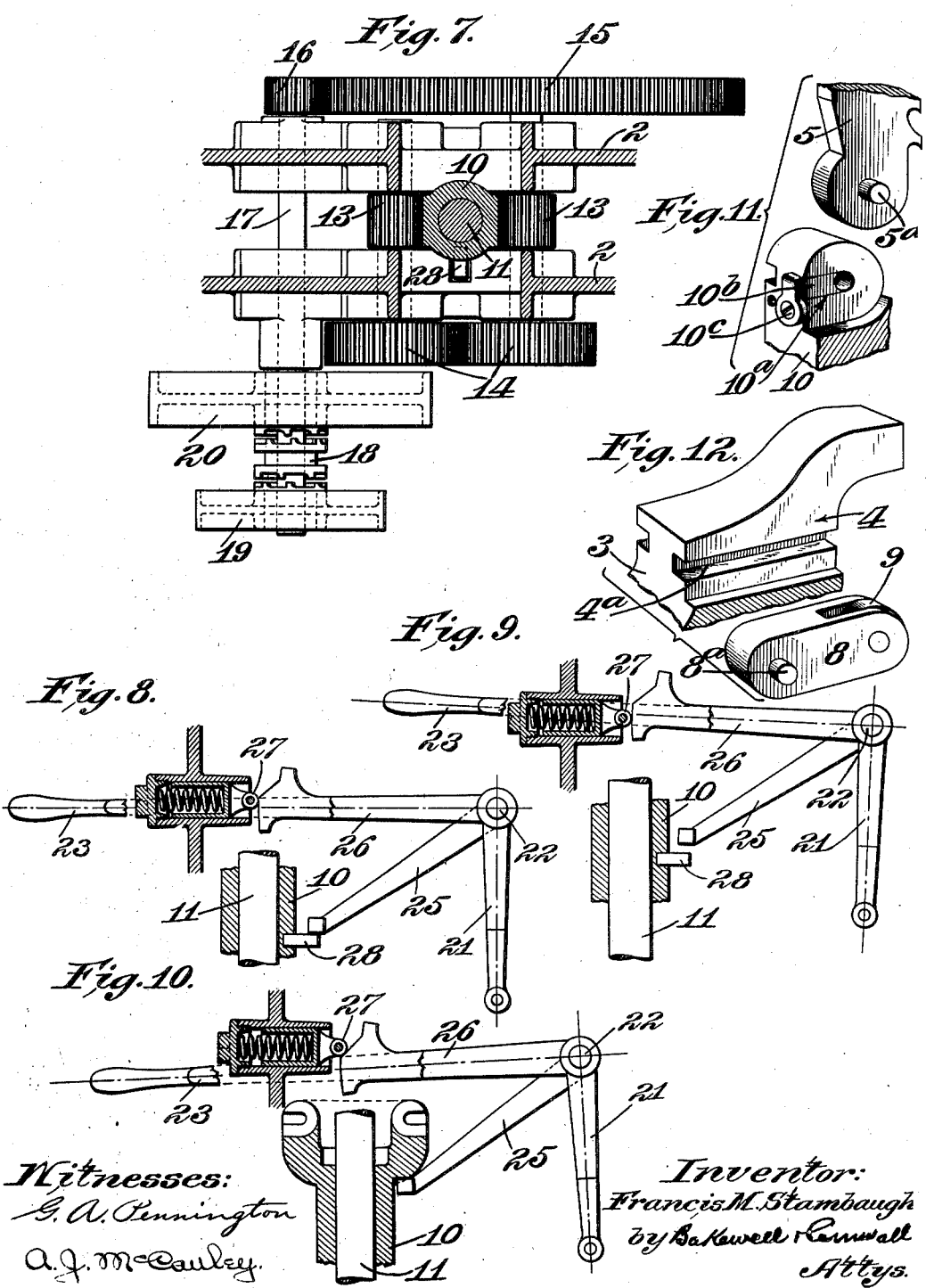

UNITED STATES PATENT OFFICE.

FRANCIS M. STAMBAUGH, OF ST. LOUIS, MISSOURI, ASSIGNOR TO THE AMERICAN BRAKE COMPANY, OF ST. LOUIS, MISSOURI, A CORPORATION OF MISSOURI.

MACHINE FOR CUTTING GEAR-WHEELS.

No. 811,336.      Specification of Letters Patent.      Patented Jan. 30, 1906.

Application filed March 7, 1905. Serial No. 248,848.

*To all whom it may concern:*

Be it known that I, FRANCIS M. STAMBAUGH, a citizen of the United States, residing at St. Louis, Missouri, have invented a certain new and useful Improvement in Machines for Cutting Gear-Wheels, of which the following is a full, clear, and exact description, such as will enable others skilled in the art to which it appertains to make and use the same, reference being had to the accompanying drawings, forming part of this specification, in which—

Figure 1 is a side elevational view of my improved machine. Fig. 2 is a front elevational view, partly in section. Fig. 3 is a top plan view of the cap-plate or cutter-guide. Fig. 4 is a top plan view of the blade-carrying cutter-head. Fig. 5 is a side elevational view of the cutter-head. Fig. 6 is a detail view, foreshortened, of the cutter-head guide and nut-pedestal. Fig. 7 is a horizontal sectional view showing the power transmission. Figs. 8, 9, and 10 are detail views of the clutch-shifting mechanism. Fig. 11 is a fragmentary view of a portion of the blade-carrying cylinder, one of the blades being detached. Fig. 12 is a portion of the cap-piece and one of the sliding blocks coöperating therewith. Fig. 13 is a side elevational view of a finished wheel made upon my improved machine, and Fig. 14 is a top plan view of the same.

This invention relates to a new and useful improvement in machines for cutting gear-wheels, the object being to synchronously cut all of the teeth at one operation.

The special use to which the machine illustrated in the drawings is applicable is the cutting of ratchet-teeth from slack-adjuster blanks, such as is shown in Figs. 13 and 14, which ratchet-teeth, together with their connected hobs, are employed as component parts of a slack-adjuster mechanism for railway rolling-stock. It is obvious, however, that depending upon the nature of the gear-wheel or ratchet-wheel to be formed the teeth of the cutting-blade may be shaped to the desired form, and attention is also directed to the fact that while I have shown these cutting-blades as being tangentially disposed it is obvious that they may be radially disposed without departing from the spirit of the invention.

In the form of machine illustrated in the accompanying drawings, 1 indicates a suitable base having side frames 2 rising therefrom, which frames are preferably divided and secured together by suitable fastening devices. The numeral 3 indicates a cap-piece mounted on the standards, which cap-piece is illustrated in Fig. 3 as being provided with tangential slots 4, in which operate cutting-blades 5. As heretofore stated, under certain conditions the slots may be radially disposed in the cap-piece, and I therefore do not limit myself to the tangential arrangement. In line with the slots 4 in the cap-piece are lugs 6, arranged near the periphery thereof and having threaded openings for the passage of adjusting-screws 7. These adjusting-screws coöperate with sliding blocks 8, arranged in the bottoms of slots 4, said sliding blocks carrying at their inner ends rollers 9, which rollers provide antifriction devices for the outer edges of the cutting-blades 5. In the walls of the respective slots 4 are grooves $4^a$, which receive the lugs $8^a$, projecting from the sides of the blocks 8, so that a guide is formed for each block 8 and the upward displacement of any of said blocks is prevented. The lower edges of the cutting-blades are so formed that when the cutter-head 10, to which they are pivotally connected, is in its upper position, as shown in Fig. 2, the cutting-blades fold outwardly, as shown in dotted lines, so as to give access to the blank or formed wheel, as the case may be. The blades 5 are pivotally mounted on the upper end of the cutter-head 10, which head is slotted tangentially, (or radially, as the case may be,) as shown in Fig. 4. Each blade is provided with a rounded perforate lower end designed to fit in the slots in the cutter-head, suitable means being provided to secure the pivots of said blade in position. Said pivots are designated by the numeral $5^a$ and are shown in Figs. 5 and 11 as being received in lateral ways $10^a$, whose outer ends may be opened to permit the insertion and removal of the pivots. After the pivots are in place blocks $10^b$ are inserted and held in place by screws $10^c$.

11 indicates a post mounted in the base and forming a guide for the cutter-head 10. This post is provided with a threaded stud on its upper end, upon which the blanks 12, as shown in Figs. 13 and 14, are mounted to be operated upon. The blank is of course uncut when originally placed in position, as shown in Fig. 2, and as the cutter-head and its carried blades descend the teeth on the blades form the teeth of the gear.

Referring to Figs. 1 to 7, it will be seen that the cutter-head is provided with racks upon opposite sides thereof, with which racks mesh pinions 13. Pinions 13 are mounted upon suitable shafts journaled in the side frames 2, said shafts carrying at one end meshing gears 14, the opposite end of one of said shafts having mounted thereon a driving-gear 15, meshing with a pinion 16. Pinion 16 is mounted on a shaft 17, journaled in the side frames, which shaft has a double-faced clutch 18 splined to and slidingly mounted thereon. On each side of clutch 18 are pulleys 19 and 20, said pulleys being loosely mounted on the shaft and provided with clutch-faces for coöperating with the clutch 18. These pulleys are driven in opposite directions by appropriate belts and in addition are of different sizes, the smaller running at a relatively high speed and being effective to drive the machine in lifting the cutter-head 10, while the larger, being operated at a relatively low speed, is effective to move the cutter-head and its connected blades outwardly while the work is being done.

Clutch 18 (see Fig. 2) is provided with an annular groove, in which enter projections from the forked end of a lever 21. Lever 21 is mounted on a rock-shaft 22, journaled in suitable brackets extending from one of the side frames and upon which rock-shaft is arranged a flexible operating lever or handle 23. This handle 23 coöperates with a stop-lug 24, rigid on one of the side frames, and when said lever is in its position under said lug the clutch 18 is out of engagement with the pulleys 19 and 20. However, when said lever is sprung from under the lug 24 and lifted the clutch 18 is thrown into engagement with the large pulley 20, and through the gearing above described the cutter-head 10 and its connected cutting-blades are caused to descend.

25 indicates an arm on the rock-shaft 22, whose end is in the path of projections on the cutter-head 10. When the cutter-head 10 descends, the head thereof strikes the arm 25 and operates the rock-shaft 22, so as to depress the lever 23 and move the clutch 18 out of engagement with the pulley 20. This is shown in Fig. 10. Rock-shaft 22 is also provided with an arm 26, having an inclined face on its end coöperating with a spring-pressed roller 27, mounted in a suitable housing on one of the side frames. As the upper end of the cutter-head 10 engages the arm 25 and compresses the same so as to disengage the clutch from the large pulley 20 the inclined portion of arm 26 is brought opposite the spring-pressed roller 27, and said spring-pressed roller acting upon said inclined face effects a further downward movement of the arm 26, and consequently a continued rocking movement of the shaft 22 and its connected parts. Clutch 18 is thus thrown into engagement with the small pulley 19, which, as before stated, is reversely rotated, and through the gearing heretofore described the cutter-head 10 and its connected parts will be elevated. As the head 10 ascends a lug 28 (see Fig. 8) will engage the arm 25 and rock the shaft 22, so as to place the clutch in a neutral position out of engagement with the small pulley 19. In this position of the parts the inclined end of arm 26 is out of engagement with the spring-pressed roller, and the lever or operating-handle 23 is brought up against the lug 24, which arrests the same and provides a stop for the parts in the neutral position of the clutch. In this position, as before stated, the blades 5 are folded back, enabling access to be had to the finished wheel and the introduction of a new blank on the upper end of post 11. To accommodate the blank so positioned, the lever 23 is disengaged from the stop 24 and lifted, as shown in Fig. 9, to throw the clutch into engagement with the large pulley 20, when the operations before described will be performed.

Referring to Fig. 2, it will be seen that the blades 5 are wider at the top than at the bottom. This construction of the blades insures the feed or bite of the successive teeth as they are brought into contact with the blank being cut. This arrangement also permits the outer straight edges of the blades to be parallel and insures a permanent adjustment of the rollers 9 without the intervention of the moving parts to cause the successive teeth to bite into the metal of the blank as the blades descend.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a machine of the class described, the combination with a base, of a cap-piece above the base provided with slots diverging from the center and having a central opening, a cutter-head alining with the opening, a plurality of teeth-cutting blades pivotally connected to said cutter-head and arranged in circular series thereon, said blades being guided in the slots in the cap-piece, and the pivots of said blades being above the cap-piece when the cutter-head is at the end of its upward stroke thereby enabling said blades to move out of a vertical plane, and means for actuating the cutter-head to move the blades into a vertical plane for cutting the teeth; substantially as described.

2. In a machine of the class described, the combination with a base, of a cap-piece above the base provided with slots diverging from the center and having a central opening, a cutter-head alining with the opening, a plurality of teeth-cutting blades pivotally connected to said cutter-head and arranged in circular series thereon, said blades being guided in the slots in the cap-piece, and the pivots of said blades being above the cap-piece when the cutter-head is at the end of its upward stroke thereby enabling said blades to move out of a vertical plane, and means for actuating the cutter-head to move the blades into a vertical plane for cutting the teeth, and for imparting a vertical reciprocatory movement to said blades when acting upon the material to be cut; substantially as described.

3. In a machine of the class described, the combination with a base, of a cap-piece above the base provided with slots diverging from the center and having a central opening, a cutter-head alining with the opening, a plurality of teeth-cutting blades pivotally connected to said cutter-head and arranged in circular series thereon, said blades being guided in the slots in the cap-piece, and the pivots of said blades being above the cap-piece when the cutter-head is at the end of its upward stroke thereby enabling said blades to move out of a vertical plane, means for actuating the cutter-head to move the blades into a vertical plane for cutting the teeth, and a work-holding device concentric with the cutter-head; substantially as described.

4. In a machine of the class described, the combination with a frame having a central opening, a work-holder alining with the opening, a series of blades arranged around the opening, guiding means for said blades, and a reciprocatory actuating device concentric with the opening and having said blades pivotally connected thereto, the pivots of said blades being normally above said guiding means to enable said blades to lie in an approximately horizontal plane, said device being capable of moving the blades to a vertical plane and thence transversely across the material to be cut; substantially as described.

5. In a machine of the class described, a frame, a cap-piece mounted on said frame and provided with a central opening, a plurality of slots formed in said cap-piece and diverging from said central opening toward the periphery of the cap-piece, a reciprocating cutter-head alining with the central opening and having a plurality of teeth-cutting blades pivotally connected thereto, said blades being guided in the slots in the cap-piece and the pivots of said blades being above the cap-piece when the cutter-head is at the end of its upward stroke thereby enabling said blades to move out of a vertical position, and blocks bearing against said blades during the downward stroke of the cutter-head to hold said blades in a vertical position; substantially as described.

6. In a machine of the class described, a frame, a cap-piece mounted on said frame and provided with a central opening, a plurality of slots formed in said cap-piece and diverging from said central opening toward the periphery of the cap-piece, a reciprocating cutter-head alining with the central opening and having a plurality of teeth-cutting blades pivotally connected thereto, said blades being guided in the slots in the cap-piece and the pivots of said blades being above the cap-piece when the cutter-head is at the end of its upward stroke thereby enabling said blades to move out of a vertical position, and adjustable blocks bearing against said blades during the downward stroke of the cutter-head to hold said blades in a vertical position; substantially as described.

7. In a machine of the class described, a frame, a cap-piece mounted on said frame and provided with a central opening, a plurality of slots formed in said cap-piece and diverging from said central opening toward the periphery of the cap-piece, a reciprocating cutter-head alining with the central opening and having a plurality of teeth-cutting blades pivotally connected thereto, said blades being guided in the slots in the cap-piece and the pivots of said blades being above the cap-piece when the cutter-head is at the end of its upward stroke thereby enabling said blades to move out of a vertical position, and blocks adjustably mounted in the side walls of said slots and provided with rollers which bear against the outer edges of said blades during the downward stroke of the cutter-head to hold said blades in a vertical position; substantially as described.

8. In a machine of the class described, the combination with a work-holder, of a cutter-head surrounding said work-holder and having a head provided with peripherally-arranged slots forming upstanding projections, grooves in the upstanding projections, a series of blades arranged in circular series and having trunnions at their lower ends journaled in the grooves in said projections, removable blocks for closing the ends of the grooves, means for holding said blocks in position, and means for reciprocating the cutter-head; substantially as described.

9. In a machine of the class described, the combination with a work-holder comprising a post having a work-engaging end, a reciprocatory cutter-head surrounding said work-holder and having slots in one end, pivoted teeth-cutting blades carried in said slots, a cap-piece surrounding the blades and cutter-head and having guide-grooves, and blade-pressing adjustable blocks working in the guide-grooves in the cap-piece; substantially as described.

10. In a machine of the class described, the combination with a work-holding post, a cutter-head surrounding said post, cutting-blades pivotally carried by said cutter-head, a cap-piece having an opening of greater diameter than the diameter of the cutter-head, and slidable blade-pressing blocks carried by said cap-piece; substantially as described.

In testimony whereof I hereunto affix my signature, in the presence of two witnesses, this 3d day of March, 1905.

FRANCIS M. STAMBAUGH.

Witnesses:
EDWARD WILSON,
GEORGE BAKEWELL.